April 14, 1942.  W. A. REICHEL  2,279,892
ALTITUDE COMPENSATION FOR RATE OF CLIMB INDICATORS
Filed Oct. 30, 1940
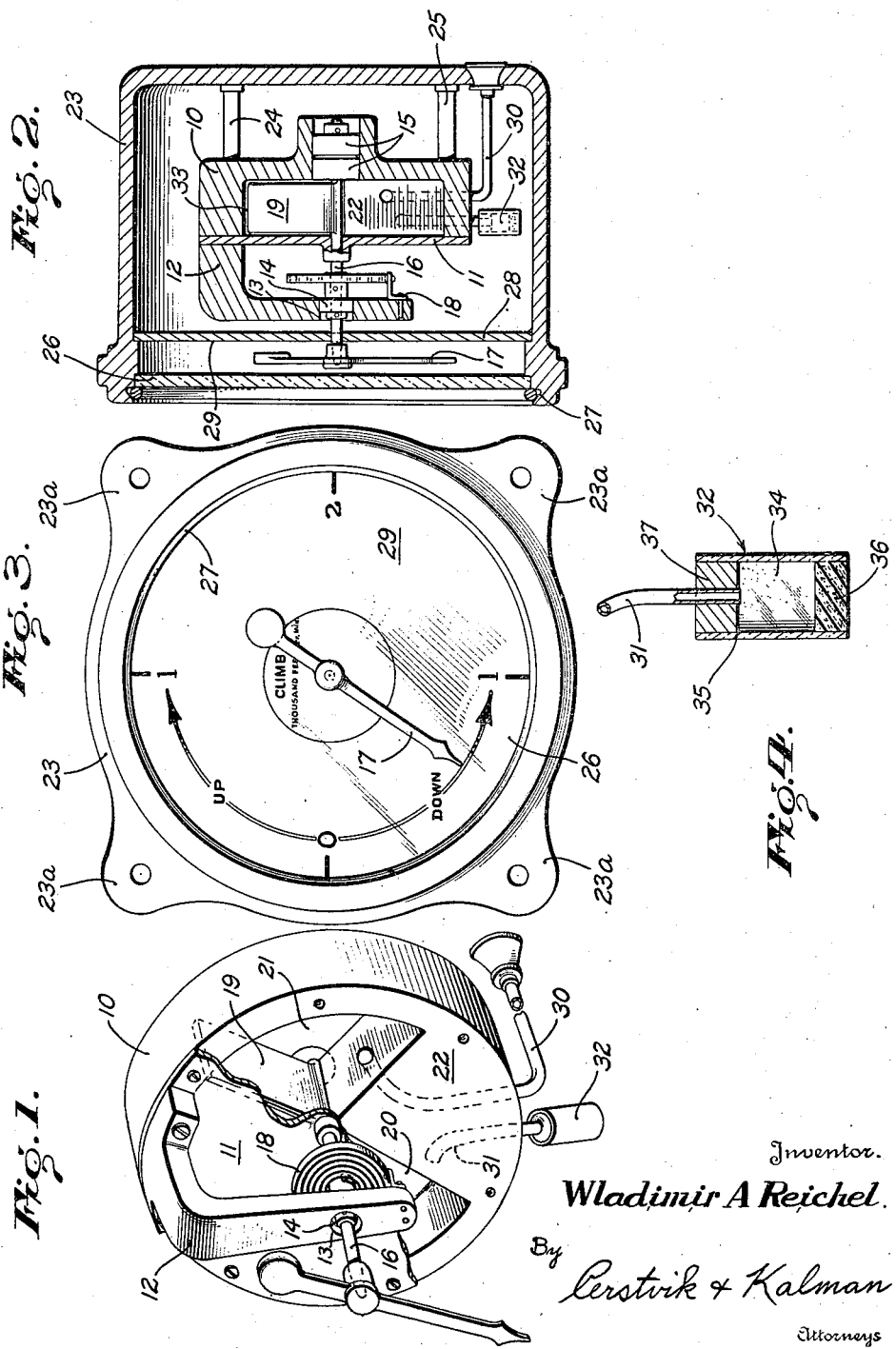
Inventor.
Wladimir A Reichel.
By Cerstvik & Kalman
Attorneys Patented Apr. 14, 1942

2,279,892

UNITED STATES PATENT OFFICE 2,279,892

ALTITUDE COMPENSATION FOR RATE OF CLIMB INDICATORS

Wladimir A. Reichel, Hackensack, N. J., assignor to Bendix Aviation Corporation, Bendix, N. J., a corporation of Delaware Application October 30, 1940, Serial No. 363,555

3 Claims. (Cl. 73—179)

This invention relates generally to pressure responsive instruments and more particularly to rate of climb indicators of the "pressure vane" type for use in aircraft wherein a differential between the pressures outside and inside of the instrument, established by a change of one of the pressures, is utilized to operate an indicator and wherein communication between the outside and inside pressures is controlled so as to provide for equalization of the pressures when the condition causing the change has ceased to exist.

Rate of climb indicators of the "pressure vane" type are known in the art but these usually depend upon external auxiliary sealed chambers, such as "thermos bottles" by the use of which restricted flow is obtained between the outside and inside pressures thereby creating a pressure differential in response to which the rate of climb or descent is indicated. These structures are subjected to altitude errors for the reason that upon an increase in altitude, air flow through the restriction is slower or more rapid, depending upon whether a small orifice or capillary tube is used and, therefore, the constant pressure differential between the outside and inside pressures which should be maintained, is destroyed and consequent erroneous indications ensue.

An object of the invention is to provide a novel rate of climb instrument of the pressure vane type with altitude error compensating means, and means whereby the use of external auxiliary pressure reservoirs is dispensed.

Another object of the invention is to provide a compact novel rate of climb instrument having control means therefor whereby the communication between the outside and inside pressures of the instrument is so controlled that a constant differential in the pressures will be maintained during a constant rate of change in craft altitude thereby providing an accurate altitude error compensation.

A further object of the invention is to provide a novel rate of climb instrument in which the indicator responds instantly to rate of climb or descent and wherein the value indicated is the true rate of climb or descent undisturbed by altitude errors.

Another object of the invention is to provide altitude compensating means for a rate of climb instrument of the "pressure vane" type.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the several views, Figure 1 is a perspective view of a rate of climb indicator embodying the invention with the case removed;

Figure 2 is a side elevation in section of the mechanism of Figure 1 enclosed within a case;

Figure 3 is a front elevation of the novel rate of climb indicator; and

Figure 4 is a sectional view of the altitude compensating unit of Figure 1.

Referring now to the drawing, 10 designates a substantially hollow cylindrical member defining a pressure chamber for the rate of climb instrument. The open end of the member 10 is normally closed by an apertured plate or cover 11 which is secured to the member 10 by any suitable means and held thereagainst by a bearing bracket 12 having an opening 13 provided with a bearing 14 which, together with bearings 15 mounted in the closed end of member 10, acts as bearing means for rotatably mounting the shaft 16 carrying a pointer or indicator 17 at one end thereof and a pressure vane 19 at the other end thereof which is normally urged to a predetermined position by a spring 18.

The rotatable shaft 16 passes through the aperture of cover 11 and the pressure vane 19 carried thereby is mounted for limited rotation within the pressure chamber of member 10 and divides the chamber into pressure chambers 20 and 21, respectively.

The member 10 is provided internally with a sector shaped partition wall 22 which extends from the inner periphery of member 10 into close relation with the shaft 16. The partition wall 22 is so provided that it is opposite to the normal position of the pressure vane 19.

The member 10 is rigidly mounted within an instrument case or housing 23 in any well known manner, such as, for example, by means of supporting members 24 and 25. The case 23 is provided with perforated lugs 23a for mounting on an instrument panel. A cover glass 26, securely held in place by means of a snap ring 27, is provided for the open end of case 23 and an air tight seal is effected for the part of the case containing member 10 from the front part of the case by means of a plate 28 provided with an opening at its center for receiving the shaft 16. A dial 29 is provided for one side of plate 28 over which the pointer 17 is superimposed for movement.

The partition wall 22 is provided with a conduit or tube 30 which communicates at one end thereof with the atmosphere outside of the case 23 and at the other end thereof with the pressure chamber 21 of member 10, thereby communicating atmospheric pressure at all times to the interior of chamber 21. The pressure chamber 20, on the other hand, communicates with the pressure within the case 23 by way of conduit or tube 31 and a diffuser element 32, the purpose of the latter to appear hereinafter.

The shaft 16 is located at the center of the cylindrical member 10 and the pressure vane 19 is of such dimensions as to provide a small gap or clearance space 33 on all sides thereof between the walls of the interior of member 10. Approximately the same clearance is afforded between the shaft 16 and the partition wall 22.

During operation, as the craft ascends upon which the present novel rate of climb instrument is provided, the altitude is increased and the surrounding pressure consequently decreased. The decreased pressure is instantaneously communicated to chamber 21 by way of conduit 30 and acts upon the related side of pressure vane 19. The pressure within case 23, however, cannot immediately equalize with the outside pressure due to the metered resistance offered by the diffuser element 32 and as the pressure within the case is greater than that within pressure chamber 21, the greater pressure will be contained in pressure chamber 20 and, therefore, the vane 19 is urged in a clockwise direction moving the pointer 17 against the tension of spring 18 over the dial 28 to indicate rate of climb which is proportional to the differential of the pressures existing within chambers 20 and 21.

When the craft levels off so that altitude change no longer takes place, the greater pressures flow from chamber 20 to 21 by way of clearance space 33 and thereby equalize whereupon the pointer 17 under action of the spring 18 returns to its normal position indicating zero rate of climb.

The reverse of the above operation obtains when the craft descends, thereby decreasing the altitude and proportionately increasing the surrounding pressures. The increased pressures are instantly communicated to pressure chamber 21 and as the pressures within the case are smaller than those in chamber 21, the vane 19 is urged into counter-clockwise rotation thereby moving indicator 17 against the tension of spring 18 to indicate rate of descent.

In known instruments provided with "thermos" bottles having restricted connections to air flow, comprising either small orifices or capillary tubes, either "under reading" or "over reading" by the instrument results and this for the reason that during constant rate of climb the pressure differential of the outside and inside pressures either increases or decreases with altitude increase or decrease. To obtain proper reading of rate of climb during varying altitudes the pressure differential between the outside and inside pressures must be maintained substantially constant during a constant rate of climb or descent and this is accomplished by the use of the diffuser element 32.

The diffuser element 32 may constitute a chamber 34 enclosed by a cylindrical wall 35 of porous material, such as porcelain, and an end plate 36 of the same composition, while the opposite end is closed by means of an apertured cover 37 receiving conduit 31. The porosity and granular structure of the diffuser element 32 is determined so that the diffuser possesses the combined characteristics of both the orifice and the capillary tube in that during varying altitudes the diffusion is automatically controlled thereby maintaining a constant differential pressure during a constant rate of climb or descent thus permitting the pointer 17 to indicate the true rate of climb or descent unaffected by altitude errors. For a more detailed description of the theory of operation and structure of the diffuser element, reference is made to the patent to Gregory V. Rylsky, No. 2,147,108, issued February 14, 1939.

Though the present invention relates only to altitude compensation for a rate of climb instrument, and temperature compensation has not been considered, should, however, the latter compensation be desirable, it may be accomplished by making the vane 19 of bi-metal in the manner disclosed in the copending application of Stephen Cerstvik, Serial No. 363,573, filed concurrently herewith and assigned to the same assignee as the present application.

From the foregoing, it will now readily appear to those skilled in the art that a novel and dependable rate of climb instrument of the "pressure vane" type has been provided wherein with the provision of a diffuser element the pointer indicates true rate of climb or descent at all times undisturbed by altitude errors.

Although only a single embodiment of the present invention has been been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

What is claimed is:

1. A rate of climb indicator for an aircraft, comprising means providing a pressure chamber, means providing a second pressure chamber, a dividing wall within said second chamber, a pressure actuated vane rotatably mounted in said second chamber, means normally retaining said vane in a predetermined position, a diffuser element in said first chamber, said second chamber being in communication with said first chamber through said diffuser element at one side of said pressure vane and one side of said dividing wall and in communication with the atmosphere at the other side of said pressure vane and the other side of said dividing wall whereby a constant differential in pressure is maintained on the two sides of said pressure vane during a constant rate of change in craft altitude, said pressure vane forming a clearance gap between an edge thereof and a wall of said second chamber whereby the vane is rotated in response to said pressure differential against the action of said retaining means and air is caused to flow through said gap to cause equalization of pressures on the two sides of said vane, and indicating means actuated by said vane, said retaining means normally resiliently urging said indicating means to a predetermined position.

2. A rate of climb indicator for an aircraft comprising a seal tight housing defining a pressure chamber, means mounted within said housing providing a second pressure chamber, a dividing partition in said second chamber, a pressure actuated vane rotatably mounted in said second chamber, means normally resiliently retaining said vane in a predetermined position, diffusing means in said housing, said second chamber being in communication with said housing through said diffusing means at one side of said pressure vane and one side of said partition and in communication with the atmosphere at the other side of said pressure vane and the other side of said partition whereby a constant differential in pressure is maintained on the two sides of said pressure vane during a constant rate of change in craft altitude, said pressure vane forming a gap between an edge thereof and a wall of said second chamber whereby the vane is rotated in response to said pressure differential against the action of said retaining means and air is caused to flow through said gap to cause equalization of pressures on the two sides of said vane, and a pointer actuated by said vane, said retaining means normally resiliently urging said pointer to a predetermined position.

3. A rate of climb indicator for an aircraft comprising a seal tight cylindrical housing defining a pressure chamber, means mounted within said housing providing a second presure chamber, a dividing member within said second chamber, a pressure actuated vane rotatably mounted in said second chamber, yieldable means normally retaining said vane in a predetermined position, a hollow cylindrical member in said housing having its side wall and an end wall formed of diffusing material, said second chamber being in communication with said housing through said cylindrical member at one side of said pressure vane and one side of said dividing member, and in communication with the atmosphere at the other side of said pressure vane and the other side of said dividing member whereby a differential in pressure is maintained during a changing craft altitude, said pressure vane forming a gap between an edge thereof and a wall of said second chamber whereby the vane is rotated in response to said pressure differential against the action of said yieldable means and air is caused to flow through said gap to cause equalization of pressures on the two sides of said vane, and a pointer actuated by said vane, said yieldable means normally maintaining said pointer in a predetermined position and said cylindrical member compensating for over-reading or under-reading of said pointer during a constant rate of climb or descent of said craft.

WLADIMER A. REICHEL.